United States Patent [19]
Peterson et al.

[11] Patent Number: 5,482,221
[45] Date of Patent: Jan. 9, 1996

[54] SINGLE ACTION FLY FISHING REEL HAVING AN INFINITELY VARIABLE SILENT DRAG

[75] Inventors: Dean M. Peterson, 2730 Peet La., Escondido, Calif. 92025; Norman L. Stauffer, Grand Lake, Colo.

[73] Assignee: Dean M. Peterson, Escondido, Calif.

[21] Appl. No.: 280,116

[22] Filed: Jul. 25, 1994

[51] Int. Cl.$^6$ ............... A01K 89/033; A01K 89/02; F16D 63/00; F16D 23/00
[52] U.S. Cl. ............ 242/285; 192/8 C; 192/415; 242/301; 188/82.1; 267/204
[58] Field of Search ............... 242/285, 286, 242/301, 282; 188/77 W, 82.1; 192/8 C, 81 C, 415; 267/204, 209, 210

[56] References Cited

U.S. PATENT DOCUMENTS

| | | |
|---|---|---|
| 2,501,378 | 3/1950 | Cintron . |
| 2,564,603 | 8/1951 | Jaskey . |
| 2,618,137 | 11/1952 | White . |
| 3,405,791 | 10/1968 | Kaplan . |
| 3,499,609 | 3/1970 | Policansky . |
| 3,727,732 | 4/1973 | Barr . |

Primary Examiner—Daniel P. Stodola
Assistant Examiner—Michael R. Mansen
Attorney, Agent, or Firm—Daniel Robbins

[57] ABSTRACT

In a fly reel, drag is provided by use a helically wound wire spring mounted coaxially over a fixed post attached to the reel frame. The turns at one end of the helically wound spring loosely contact the fixed post, while at the other end of the spring the turns are in intimate contact with the post. One end of the spring is free and the other end is fixed to a spool axially straddling the spring-post combination. The spool contains a drag adjustment knob whose initial setting determines the angular travel of the spool until a pin on the knob contacts the free end of the spring. As line is stripped from the spool, the spool rotates and the loose turns incrementally tighten about the fixed post. This generates a torque on the spool causing drag on the line, the torque linearly increasing with spool rotation until the spool advances to where the pin on the adjustment knob engages the free end of the spring wire, forcing the spring turns to relax about the post so as to maintain the torque value that existed when the pin first contacted the wire's free end. In the direction of opposite rotation of the spool, the spool applies a force to the spring decoupling the spring coils from the post, and no drag torque is generated to oppose the turning of the crank for this direction of reel rotation. The drag adjustment is infinitely variable, and the drag is silently generated.

15 Claims, 3 Drawing Sheets

SINGLE ACTION FLY FISHING REEL HAVING AN INFINITELY VARIABLE SILENT DRAG

BACKGROUND OF THE INVENTION

1. Field of the Invention

This invention relates to fishing tackle, and in particular to a single action fly fishing reel.

2. Description Relative to the Prior Art

Fly fishing is one of the most popular and growing participant sports in the United States. It is estimated that in 1986 there were one million fly fishers, and in 1992 the number had risen to three million. Along with this explosive growth, there has been a proliferation of fly fishing tackle in rods, reels, lines and flies.

The fly reel is one of the most important tackle components. Fly reels are designated either as single action reels where one rotation of the reel handle results in one rotation of the reel spool, or as multiple action reels where the ratio between spool and handle rotation is greater than 1. The single action reel is the more common, and it's use is generally specified in fly fishing competitions.

The reel serves several functions. It is a storage medium for the fishing line, it provides drag as line is stripped from the reel's spool, and it allows the fisherman to control the action in retrieving a hooked fish. In accomplishing these last two functions, drag is an essential reel feature. During stripping out of line (either by the fisherman or the fish), the rotating spool gathers momentum, and when the stripping is arrested the spool must be immediately braked to keep the inertia of the spool from throwing a loop of line. The drag provides this braking action.

The drag is also used to cause resistance to the removal of line by the fish so as to quickly tire the fish or to prevent the fish from making very long runs in its effort to escape. When used in this manner it is desirable to have an adjustment on the amount of drag torque and to have a drag which is smooth in its action. In the simplest reels the same amount of drag is provided for both directions of the reel rotation, and in more sophisticated reels the amount of drag is greater for the spool rotation direction when line is being stripped from the reel than it is for the spool rotation direction when the fisherman is reeling in the fish.

Drag systems are typically of two general types. One type uses a pawl which engages gear like teeth attached to the rotating spool. These systems do not provide smooth torque resistance to spool rotation and in many embodiments are difficult to adjust. A second common type uses the friction of a disc or pad against the rotating spool or a member which rotates with the spool. These disc drag systems often incorporate type of coupling which allows the drag to be operational only when the line is being removed from the spool. In disc drag systems any water or oil which may get on the pad surface during the operation can seriously alter the drag setting altering the torque or causing uneven operation.

Fishing conditions widely vary, and the fisherman wants the option of changing the line used depending on the specific fishing situation. Many reels include the provision of quick change spools allowing the immediate changeover of line in the field. These spools may contain mechanical elements involved in the drag mechanism, so that maintaining a selection of spools storing different types and weights of lines may involve duplication of these mechanical elements for each spool, entailing additional costs.

SUMMARY OF THE INVENTION

Rather than using precision mechanical elements in the spool and frame assemblies of a single action fly reel to provide drag, the present invention controls drag by use a helically wound, wire spring mounted coaxially over a fixed post attached to the reel frame. The turns at one end of the helically wound spring loosely contact the fixed post, while at the other end of the spring the turns are in intimate contact with the post. A spool, containing no mechanical elements (other than a handle attached to a flange of the spool) and an adjustment knob located on the flange, is mounted to axially straddle the spring-post combination. The end of the spring wire at the loose turns of the spring is fixed to the spool, and the other end of the spring wire is configured as a free end extending perpendicular to the fixed post. This extending spring end is positioned to be contacted by a pin extending from the drag adjustment knob mounted on the flange as the spool rotates. The initial setting of the drag adjustment knob determines the angular travel of the spool until the pin contacts the spring end. As line is stripped from the spool, the spool rotates and the direction of winding of the helical spring is such that under the spool rotation the loose turns incrementally tighten about the fixed post. This generates a spring torque on the spool causing drag on the line, the torque linearly increasing with spool rotation until the pin on the adjustment knob engages the free end of the spring wire. The pin then pushes the free end so as to reduce the radial contact between the tight coils of the spring and the post. The knob adjustment pin maintains contact with the wire end of the spring, just forcing the spring turns to continue to relax about the post so as to maintain the torque value that existed when the pin first contacted the wire's free end. The spool body and the spring now continue to rotate about the post with the spring coils partially relaxed under the "nudging" of the pin to maintain this fixed frictional torque.

At any time, if the handle of spool is turned in the direction for opposite rotation of the spool, i.e., the direction to retrieve the fish or roll in the line, the spool affixed to one end of the spring, applies a force to the spring decoupling the spring coils from the post, and only minimum drag torque is generated to oppose the turning of the crank for this direction of reel rotation. Under this condition, i.e., when reeling in a fish, the fisherman feels the direct action of the pull of the fish without any intervening reel drag.

The clockwise or counter clockwise directional sense in which the spring of the reel is wound defines the "handedness" of the fishing reel, i.e., a "left handed" or "right handed" reel. Both a clockwise and a counter clockwise wound spring may be supplied with the reel kit to allow a simply performed change over from one "handedness" of the reel to the other.

Because the spool of the reel of the invention is simply a bobbin containing no precision mechanical elements, it is fabricated from a low density, light weight plastic. An angler may be carrying several spools with different types and weights of line on his person while fishing, and the low weight plastic spool serves to lighten the angler's load in the field.

Additionally, the drag system of the present invention overcomes the disadvantages of previously available drag systems. The drag action is very smooth and the amount of drag is unaffected by fluids which might inadvertently get into the reel. The minimum number of moving parts provides a reel drag that is highly reliable.

It will also be appreciated that the drag is infinitely variable over the drag range provided, and that the reel is silent for all modes of its operation. However, a "noise maker" may be added to the reel to provide a clicking sound during reel rotation for those fisherman habituated to the sounds associated with reels of the prior art.

BRIEF DESCRIPTION OF THE DRAWINGS

The invention will be described with respect to the drawings of which.

DESCRIPTION OF THE PREFERRED EMBODIMENTS

Figure 1:
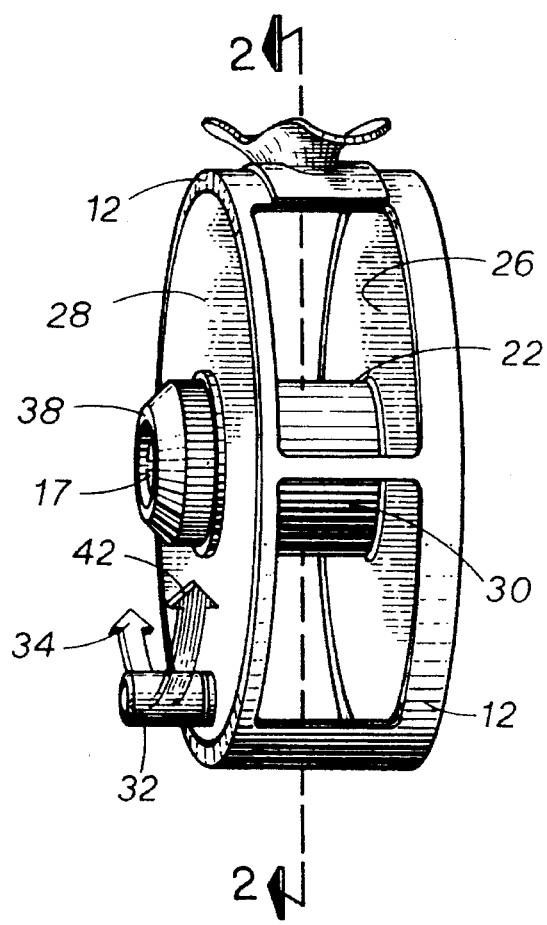
FIG. 1 is a perspective drawing of an assembled fishing reel in accordance with the invention.
Figure 2:
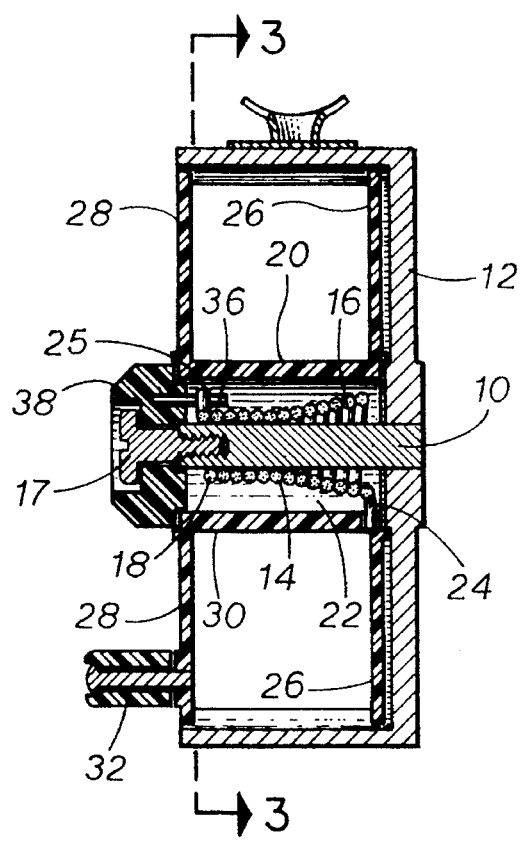
FIG. 2 is a sectional drawing of the fishing reel along the line 2—2 of FIG. 1.
Figure 3:
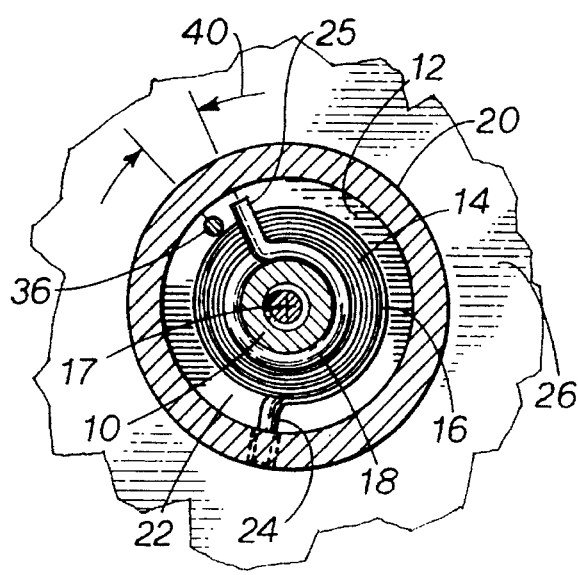
FIG. 3 is an axial view drawing showing the post and spring assembly of the fishing reel of FIG. 1, FIG. 4a and FIG. 4b are trimetric drawings of springs wound as to "handedness"
Figure 4A:
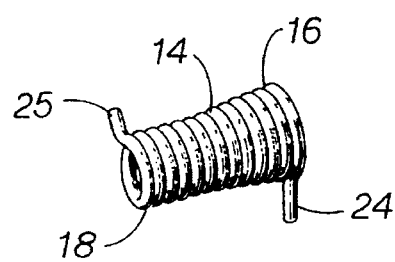
Figure 4B:
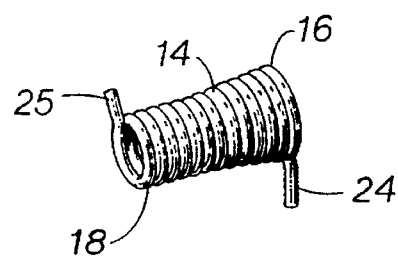

Referring to FIG. 2, a post 10 is attached to a frame 12 of a single action fly reel. Mounted on the post 10 is a helically wound spring 14 whose lower coils 16 are loosely wrapped about the post 10, and whose upper coils 18 are tightly wrapped around the post 10. The spring 14 may be fabricated from wire having a round cross section or wire which has a square cross section. The spring 14 may be configured in a conical shape so that turns at the wider diameter of the conical shape correspond to the loose turns, and the turns at the narrower diameter of the conical shape correspond to the tight turns of the spring 14, as seen in FIG. 2. A spool 20 having a cylindrical hollow 22 is mounted so that the post 10 and spring 14 are coaxial with the hollow 22, but do not touch the sides of the hollow 22. Its flange 26 rides in a groove in the frame 12. The end 24 of the spring 14 is secured to the body 30 of the spool 20. The other end 25 of the spring 14 is free, and extends outwardly in a direction perpendicular to the post 10. The spool 20 with flanges 26, 28 at the opposite ends of the body 30, has a handle 32 rotatably mounted on the flange 28. Mounted on the flange 28, is also a rotatable drag adjustment knob 38 which may be manually adjusted to set the amount of drag desired. Attached to the under side of the knob 38 is a pin 36 whose angular separation 40, measured from the line along which the free end 25 of the spring lies, determines the drag. The greater the angular separation 40, as determined by the drag setting rotational position of the knob 38, the greater the drag, as will be explained below. When fishing line (not shown), wound about the body 30 in the appropriate winding direction is stripped from the spool 20, the spool 20 turns in the direction of the arrow 34. This causes the loose coils 16 of the spring 14 to flex so as to tighten about the post 10, generating a hold back torque acting on the spool 20 which increases linearly with the angular displacement of the spool 20 from its rest position. At the same time, the pin 36 is angularly advancing towards the spring free end 25, and when the pin 36 contacts the spring free end 25 it pushes on the spring free end 25 in the direction to loosen the tight turns 18 of the spring 14 about the post 10. The tight turns 18 relax just enough under the urging of the pin 36 against the spring free end 25 to maintain the torque at the preset value determined by the operator's setting, and the spool 20 and the spring 14 rotate as a unit around the post 10 generating this torque, as line is further withdrawn.

When retrieving line, the handle 32 is used to rotate the spool 20 in the direction of the arrow 42, opposite to the direction 34 of spool 20 rotation during line stripping. Spool rotation in the direction 42 causes the end of the spring 24 to move so as to completely relax the grip of the coils of the spring 14 about the post 10, and the spool 20 and the spring 14 rotate about the post 10 completely free of holdback torque.

Figure 5:
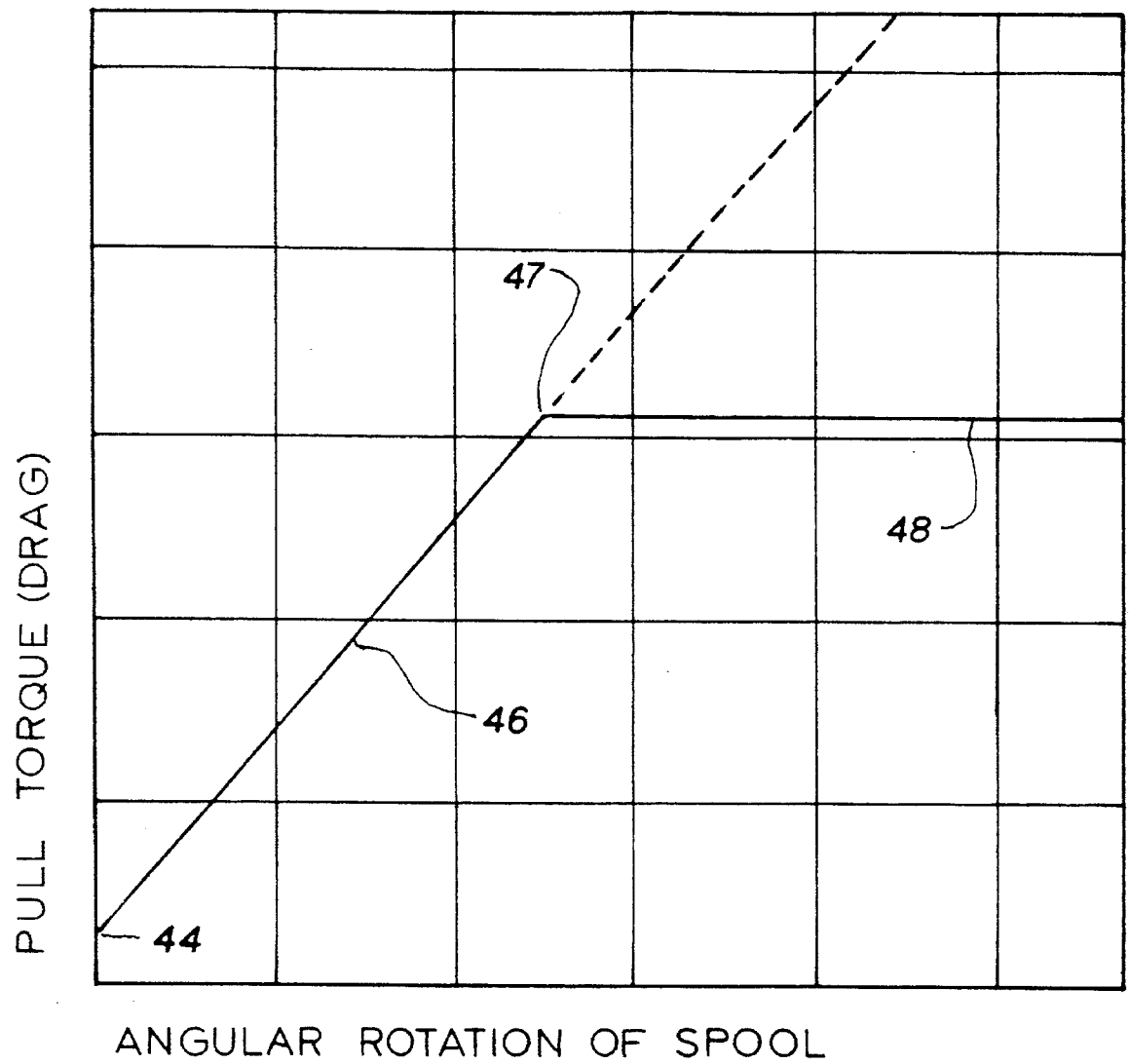
FIG. 5 is a graph of torque provided by the fishing reel of the invention as a function of spool rotation.

Another important feature of the reel of the invention may be understood by referring to FIG. 2 in combination with FIG. 5. Just as the loose coils 16 (FIG. 2) begin to contract about the post 10, the line experiences the initial drag 44 (FIG. 5).The torque then linearly increases 46, until the preset drag point 47, at which point the drag remains set at the preset level 48, as explained supra. Meanwhile the tension in the fishing line is correspondingly gradually increasing. It is important to note that unlike the drag of the reels of the prior art where the full value of drag comes into play as soon as the fish begins stripping line from the spool, the drag of the reel of the invention gradually builds up along the curve 44–47. Hence, in the prior art the fly line and the leader connecting the fly to the line ( with some help from the bending of the rod) take the full brunt of the fish's initial strike. In the present invention the gradual increase in drag 44–47 acts as a "shock absorber" cushioning the leader on the initial strike, and minimizing the chances of breaking the leader or tearing the hook from the fish's mouth.

It will also be seen from FIG. 5 that the drag is continuously variable over its entire range, and from FIG. 2 it may be seen that the drag is silently generated.

Figure 6:
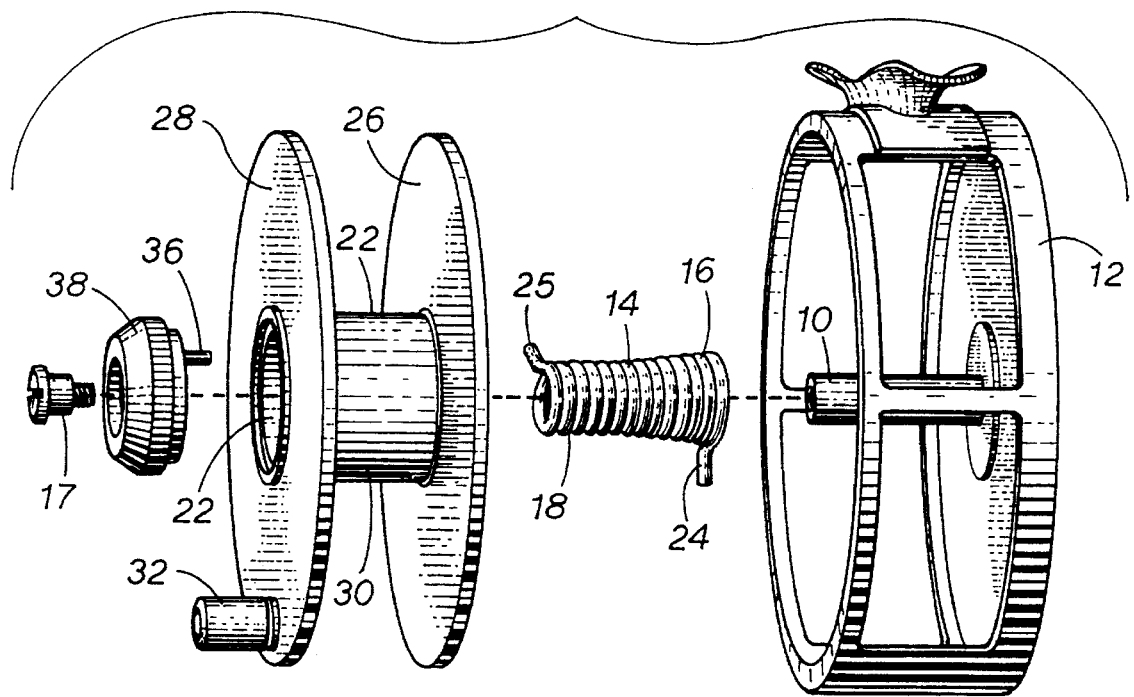
FIG. 6 is an exploded view drawing of the fishing reel of FIG. 1.
Figure 7:
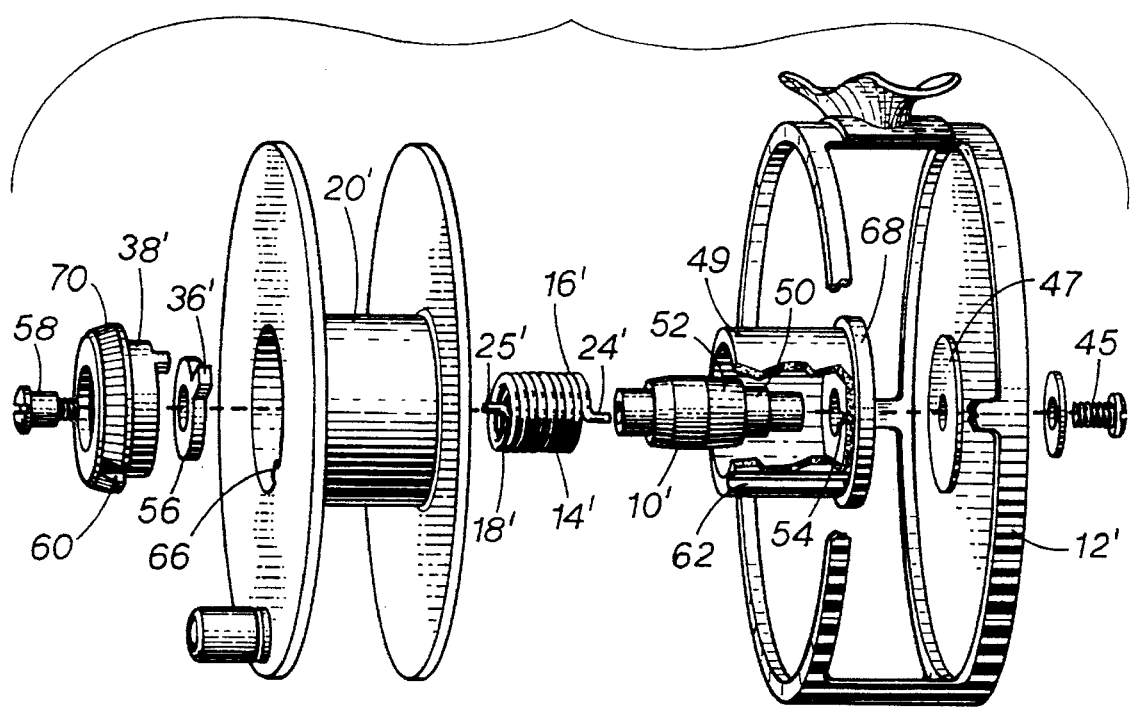
FIG. 7 is an exploded view drawing of a removable spool embodiment of the fishing reel of the invention.

In a second embodiment, the principle of the invention is applied to a reel incorporating a quick change spool. Referring to FIG. 7, the portion of a frame 12' which anchors the spooling mechanism is shown.(In the drawings, different but related elements are identified with the same reference character, albeit that such corresponding elements in the different drawings are distinguished by the use of primes.) A screw 45 passing through the frame 12', washer 47 and sleeve 49, threads into post 10' securing the post 10' to the frame 12'. The sleeve 49 is (at this point ) free to rotate about the collar 50 of the post 10'. The post 10' is not axially cylindrical throughout it's length, but is provided with a partial conical taper 52. A helically wound spring 14' configured in a cylindrical form, wraps the post 10'. The cylindrically configured spring 14' wrapping the post 10' thus replicates the loose coils 16 (FIGS. 2, 6) at coil turns 16' and tight coils 18 (FIGS. 2, 6) at coil turns 18'. The end of the spring wire 24' is locked into the notch 54 of the sleeve 49. The adjustment knob 38' has an insert ring 56 carrying the pin 36' for engagement with the free end 25' of the spring 14' in the manner previously described (FIG. 2). The adjustment knob 38' contains a slot 60 in its rim for alignment with a slot 62 in the sleeve 49. The adjustment knob 38' is attached to the tapered post 52 by means of the screw 58, whose shaft bottoms in the tapered post 52 so that while the adjustment knob 38' is held to the tapered post 52 it is still free to rotate relative to the tapered post 52. A cover plate (not shown) fits into a recess in the adjustment knob 38' covering the head of the screw 58. A removable spool 20' contains a key 66 running the axial length of the spool 20'.

With the slot 60 of the adjustment knob 38' aligned with the slot 62 of the sleeve 49, the removable spool 20' may be inserted into the reel with the key 66 of the spool 20' sliding through the aligned slots 60, 62. With the spool fully seated on the rim 68 of the sleeve 49, the key 66 just clears the rim 70 of the adjustment knob 38', and rotation of the adjustment knob 38' not only sets the desired drag but also locks the removable spool 20' to the sleeve 49. It will be appreciated that the removable spool 20' and sleeve 49 replicate the operational characteristics, with respect to providing an adjustable drag in cooperation with the spring 18' as disclosed in the embodiment of the fixed spool 20 and spring 18 of FIG. 2.

The invention has been described in detail with particular reference to preferred embodiments thereof, but it will be understood that variations and modifications can be effected within the spirit and scope of the invention.

What is claimed is:

1. A fishing reel comprising:
   a) a frame,
   b) a post mounted on said frame,
   c) a helically coiled spring axially surrounding said post, said spring having a first end connected to a first number of coils of said spring in loose contact with said post and said spring having a second end connected to a second number of coils of said spring in intimate contact with said post,
   d) a spool for winding fishing line thereon, said spool having a handle thereon, said spool further having an axial cavity therein whereby said spool is rotatably mounted over said spring and said post, wherein said first spring end is connected to said spool, and wherein said second spring end is free and extends into said cavity,
   e) a drag adjustment knob axially mounted on said spool, said knob having a pin extending into said cavity whereby said pin by adjustment of said knob is adjustably angularly positioned at a set angle from said second spring end, whereby when said spool is rotated in the direction to strip said line from said spool, said first number of coils tighten about said spool linearly increasing the torque between said spool and said post until said pin rotates into the position whereby it contacts said second end of said spring causing said second number of coils to loosen about said post reducing the torque between said spool and said post, and whereby said torque is maintained at a substantially constant value.

2. The reel of claim 1 wherein said post is substantially in the form of a right cylinder and said helically coiled spring is configured in a conical shape.

3. The reel of claim 1 wherein said post is substantially conical in shape and said helically coiled spring is configured as a right cylinder.

4. The reel of claim 1 configured as a "right handed" reel wherein said spring is wound in a first sense direction.

5. The reel of claim 1 configured as a "left handed" reel wherein said spring is wound in a second sense direction.

6. The reel of claim 1 wherein said spool is a plastic spool.

7. The reel of claim 1 wherein the drag torque on said spool increases linearly with reel rotation for spool rotation direction corresponding to stripping line from said spool until a preset drag value is reached, said drag torque then remaining constant.

8. A fishing reel comprising:
   a) a frame,
   b) a post mounted on said frame,
   c) a helically coiled spring axially surrounding said post, said spring having a first end connected to a first number of coils of said spring in loose contact with said post and said spring having a second end connected to a second number of coils of said spring in intimate contact with said post,
   d) a cylindrical sleeve, said sleeve having an axial cavity therein whereby said sleeve is rotatably mounted over said spring and said post, wherein said first spring end is connected to said sleeve, and wherein said second spring end is free and extends into said cavity,
   e) a drag adjustment knob axially mounted on said post, said knob having a pin extending into said cavity whereby said pin by adjustment of said knob is adjustably angularly positionable at a set angle from said second spring end, whereby said knob both sets the drag level and locks said spool to said reel,
   f) a removable fishing line storage spool configured to axially slide over said knob and said post for locking engagement with said sleeve, said spool being axially locked to said sleeve by said adjustment knob when said knob is rotated relative to said post, and further whereby when said sleeve is rotated in the direction to strip said line from said spool, said first number of coils tighten about said post linearly increasing the torque between said spool and said post until said pin rotates into the position whereby it contacts said second end of said spring causing said second number of coils to loosen about said post reducing the torque between said spool and said post, and whereby said torque is maintained at a substantially constant value.

9. The reel of claim 7 wherein said post is substantially in the form of a right cylinder and said helically coiled spring is configured in a conical shape.

10. The reel of claim 8 wherein said post is substantially conical in shape and said helically coiled spring is configured as a right cylinder.

11. The reel of claim 8 configured as a "right handed" reel wherein said spring is wound in a first directional sense.

12. The reel of claim 8 configured as a "left handed" reel wherein said spring is wound in a second directional 13. The reel of claim 8 wherein the drag torque on said spool increases linearly with reel rotation for spool rotation direction corresponding to stripping line from said spool until a preset drag value is reached, said drag torque then remaining constant.

14. The reel of claim 8 wherein said spool is a plastic spool.

15. A fishing reel comprising:
   a) rotatable means for storing fishing line,
   b) means for providing a selectable first value of drag torque on said rotatable means for a first direction of rotation of said rotatable means, and for providing a second value of torque for a second direction of rotation of said rotatable means, and
   c) means for providing linearly increasing drag torque for rotation of said rotatable means for said first direction of rotation until said selectable first value of drag is attained, and for further maintaining said drag torque at said selectable value for said first direction of rotation of said rotatable means.

* * * * *